July 8, 1941.  W. F. KRENZKE  2,248,764
SPRING LEVER CLUTCH
Filed Nov. 24, 1939
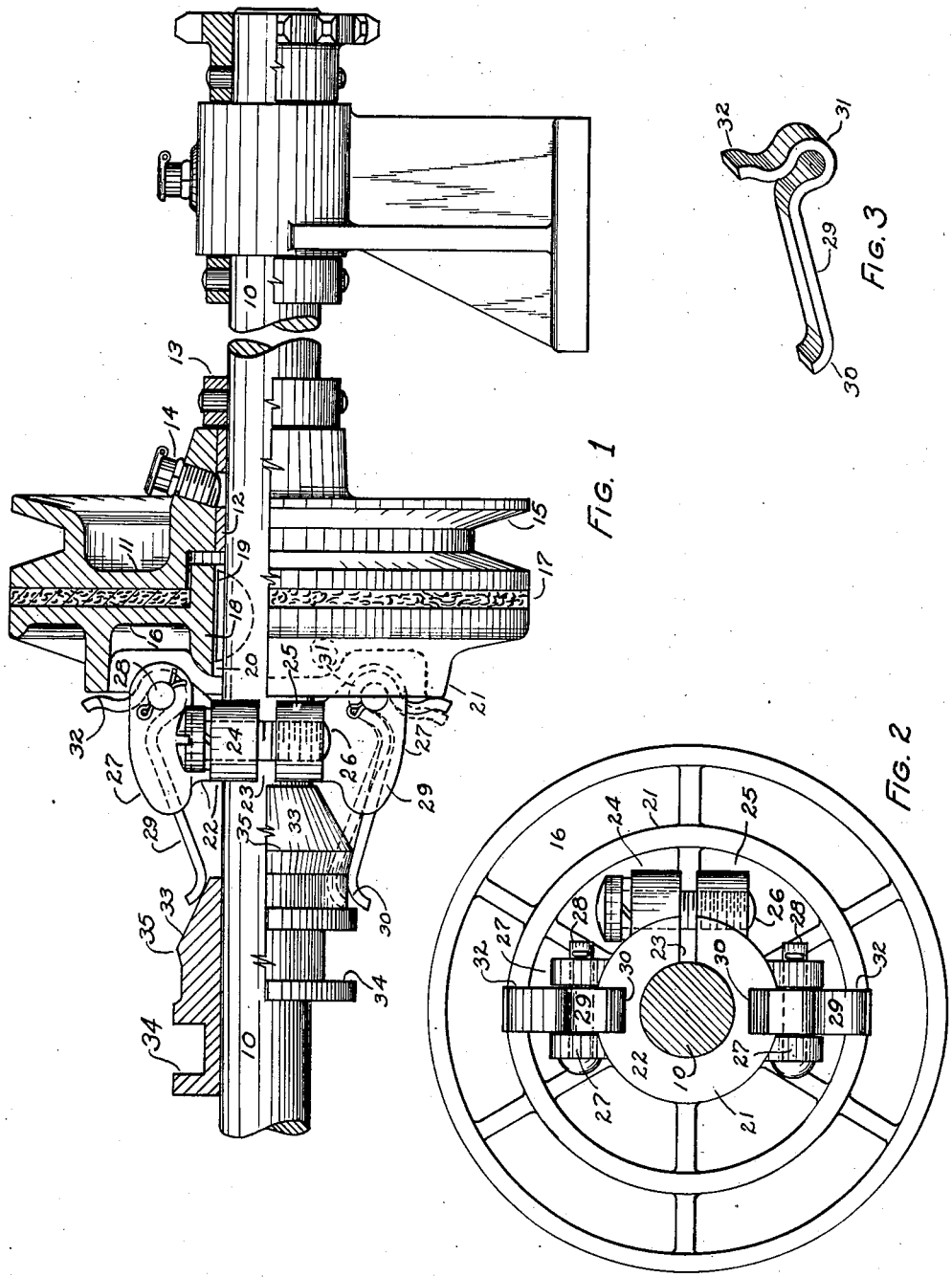
INVENTOR.
WILLIAM F. KRENZKE
BY  A.S.Krob
ATTORNEY Patented July 8, 1941

2,248,764

UNITED STATES PATENT OFFICE 2,248,764

SPRING LEVER CLUTCH

William F. Krenzke, Racine, Wis., assignor to Jacobsen Manufacturing Company, Racine, Wis., a company of Wisconsin Application November 24, 1939, Serial No. 305,756

4 Claims. (Cl. 192—66)

The present invention relates to clutches which are especially adapted for small power transmission.

The principal object of the present invention is to provide a clutch having yielding shifting levers of novel design.

Another object of the present invention is to provide a clutch which is very simple, easily and cheaply manufactured and easily and cheaply maintained.

The present invention is particularly adapted for use on power driven lawn mowers and the like wherein the clutch must be very simple and easily adjusted for wear, and easily understood and handled by the type of help usually employed for operating lawn mowers and small power devices.

To these and other useful ends my invention consists of parts, combinations of parts, or their equivalents, and mode of operation, as hereinafter set forth and claimed and shown in the accompanying drawing in which:

Fig. 1 is a transverse partially sectioned view of my improved clutch illustrating a fraction of the cone in section with the clutch out of engagement and a fraction of the cone in plan and in its engaged position.

Fig. 2 is a front view of the device shown in Figure 1 having the cone removed.

Fig. 3 is a perspective view of the preferred form of spring lever.

As thus illustrated, numeral 10 designates the shaft on which the clutch is mounted having rotatably mounted thereon a driven or driving clutch plate 11, having a bushing 12 and being held in longitudinal position by a collar 13 which is suitably secured to the shaft. Member 11 is provided preferably with an oiling device 14 and a V-belt groove 15.

I provide a clutch plate 16 having preferably an annular clutch pad 17. This pad may be made from fibrous material or any material which is suitable for devices of the class. Obviously member 17 may be rigidly secured to either members 11 or 16 or left free. In the latter event, it will be rotatably carried by hub 18 as clearly illustrated in Figure 1.

Hub 18 is preferably splined to shaft 10 by means of a key 19 which is secured in shaft 10 and having a slidable fit in a key-way 20 in hub 18. Thus when member 16 is moved toward member 11, the clutch will be engaged and form an operating connection between the clutch members and the shaft. I provide preferably, an annular ring 21 on member 16 for contact with the clutch levers.

I provide a lever carrying collar 22 being split as at 23 forming lugs 24 and 25. A bolt 26 fits freely into lug 24 and is screw threaded into lug 25. Thus the collar may be moved and locked into the desired position. It will be understood that collar 22 may be screw threaded on shaft 10 or secured to any member of the clutch as is common practice. In either event, this collar may be adjusted longitudinally for purposes which will hereinafter appear.

On opposite sides of collar 22 I provide preferably pairs of ears 27—27 being suitably spaced for the reception of levers 29—29. Members 27 are extended longitudinally as illustrated in Figure 1 so as to provide retaining means for the levers thus to effectively counteract any twisting strain that may be applied to the free ends of the levers when the clutch is being engaged or disengaged.

Levers 29 are carried by bolts 28—28 which are held into position by means of cotter pins as illustrated. Clearly, therefore, the levers may be easily removed and replaced. Numeral 29 designates a spring lever in its entirety which is preferably formed from a flat spring steel strip as clearly illustrated in Figure 3 having an upturned front end as at 30 and a loop formation 31, the other end being extended outwardly at a right angle to the front end of the lever as illustrated, its end being curved preferably as at 32.

Loop 31 is made preferably to loosely embrace bolts 28. Thus it will be seen that member 29 may be easily formed from a flat strip of steel having spring characteristics.

As illustrated, the front end 30 of member 29 will lie close to shaft 10 when the clutch is not engaged. I provide a shifting cone 33 having a groove 34 adapted to be engaged by the shifting fork (not shown) the design of which is too well known to require further description. The cone part of member 33 terminates as at 35 forming a slight depression at this point over which member 30 moves for permanent engagement.

In the sectioned half of cone 33 I illustrate this member in disengaged position and in the lower half of the cone shown in plan, I illustrate the cone in its engaged position. That is, the position required for engaging the clutch.

By scrutinizing Figure 1 it will be seen that when the cone is moved forward for purposes of engaging the clutch, member 29 for its length will act as a yielding member between the cone and the annular ring 21. Thus when the clutch is engaged, members 11 and 16 will be yieldingly held against member 17.

It will be understood that member 29 is adapted to put sufficient pressure on clutch plate 17 to prevent slipping under maximum load.

It will be seen that in very small clutches of the type, if member 29 was made from a rigid piece of metal, it would be very difficult to adjust collar 22 to the position where the clutch could be easily thrown into and out of engagement and still be tight enough to supply sufficient pressure for maximum load.

In devices of the kind and size having rigid levers between the cone and clutch, if the adjustment was made so the clutch could be easily thrown in and out of engagement, in a very short time it would probably be too loose to transmit maximum power. In my device, the levers may be made to suit the size of the clutch and the user is insured an easily operated and positively acting clutch.

It will be seen that there are four objectives accomplished by my device. First, the adjusting means is clearly simplified. Second, the levers are very cheaply and easily made. Third, an ordinary person with little or no mechanical skill will be able to keep the clutch in adjustment. Fourth, the clutch may easily be thrown into and out of engagement and will transmit maximum power with very infrequent adjustments.

Having thus shown and described my invention, I claim:

1. A device of the class described, comprising a shaft having spline mounted thereon a clutch plate with an annular projecting ring for contact with clutch operating levers, another clutch plate rotatably mounted on said shaft and longitudinally fixed with respect to the shaft, a collar longitudinally adjustably secured to said shaft adjacent said first clutch plate and having two or more pairs of spaced ears, bolts extending through said pairs of ears substantially in alignment with the transverse plane of the surface of said annular ring, a cone slidably mounted on said shaft adjacent said collar, clutch levers hingedly mounted on said bolts between said pairs of ears and adapted to contact said annular ring and cause said first and second clutch members to be operatively engaged when said cone is moved under the free ends of said levers, said levers comprising substantially uniform in cross section flat strips having spring characteristics, offset loops formed near the clutch end of said strips adapted to partially embrace said bolts thereby forming said hinges.

2. A device of the class described, comprising a shaft having spline mounted thereon a clutch plate with an annular member, another clutch plate rotatably mounted on said shaft and longitudinally fixed with respect to the shaft, longitudinally adjustable collar positioned adjacent said first clutch plate and secured against longitudinal movement with respect to the shaft and having two or more pairs of spaced ears, bolts extending through said pairs of ears substantially in alignment with the transverse plane of the surface of said annular member, a cone slidably mounted on said shaft adjacent said collar, clutch levers hingedly mounted on said bolts between said pairs of ears and adapted to contact said annular member and cause said first and second clutch members to be operatively engaged when said cone is moved under the free ends of said levers, said levers comprising uniform flat metal strips having spring characteristics, the cone ends of said strips being slightly curved to thereby form convex contacting surfaces for said clutch cone, offset loops formed near the clutch ends of said levers on the same sides of the strips as said convex surfaces, said loops adapted to partially embrace said bolts as fulcrums, the clutch ends extending from said loops to thereby form bell cranks adapted to yieldingly transmit motion from the cone to said annular member.

3. A clutch lever of the class described, comprising a substantially uniform flat strip for its length having spring characteristics, one end adapted to be engaged longitudinally by a clutch operating cone, an offset loop in said strip a relatively short distance from the other end adapted to largely embrace a bolt or pin as a fulcrum, said other end extending outwardly in the opposite direction from said loop forming a bell crank, whereby said strip for substantially its entire length will bend to thereby provide a yielding pressure on the clutch when engaged by the clutch operating cone.

4. A clutch lever of the class described, comprising a substantially uniform flat strip for its entire length having spring characteristics, one end adapted to be engaged by a clutch collar, an offset loop near the other end adapted to largely embrace a bolt or pin as a fulcrum, the other end being relatively short and adapted to engage a clutch plate.

WILLIAM F. KRENZKE.